March 3, 1942.  N. J. RITZERT  2,275,233
METHOD OF MAKING V-BELTS
Filed March 13, 1941
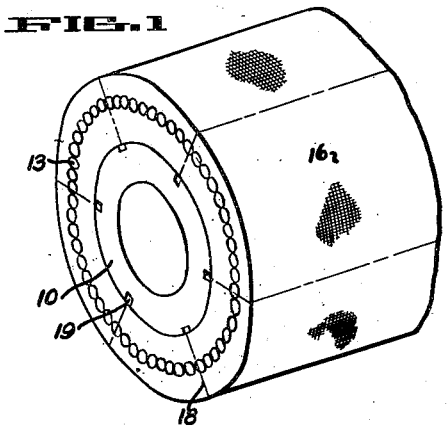
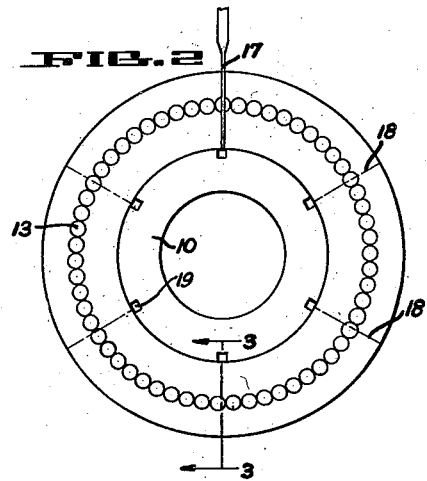
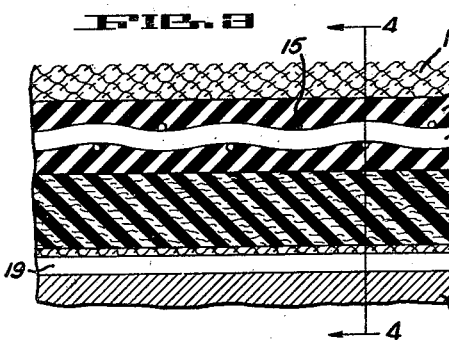
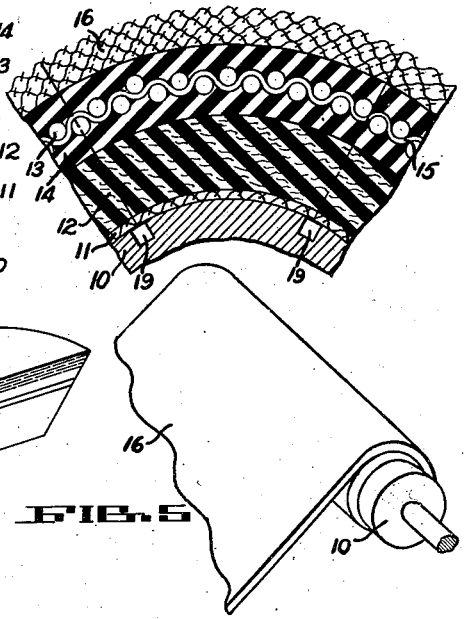
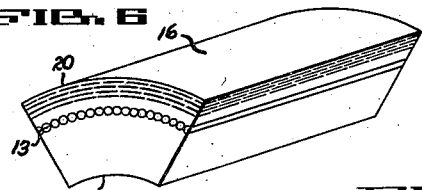
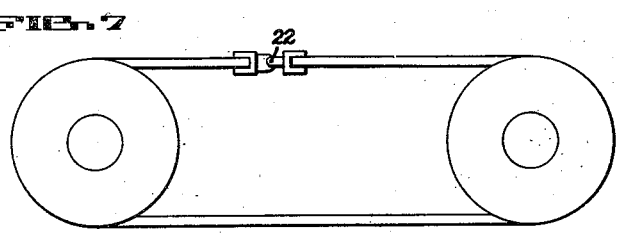
INVENTOR
NORMAN J. RITZERT
ATTORNEYS Patented Mar. 3, 1942

2,275,233

UNITED STATES PATENT OFFICE 2,275,233

METHOD OF MAKING V-BELTS

Norman J. Ritzert, Dayton, Ohio, assignor to The Dayton Rubber Manufacturing Company, Dayton, Ohio, a corporation of Ohio Application March 13, 1941, Serial No. 383,195

8 Claims. (Cl. 154—4)

My invention relates to belts. The invention, more particularly, is concerned with an improved method of making belts which are adapted to be cut to the desired length and the ends suitably fastened together by a belt connector or other means to form an endless belt.

It is a principal object of this invention to devise a method of making a V-belt or a belt having a trapezoidal shaped cross section which is built up on the surface of a mandrel and one or more belts cut therefrom to produce a long length V-type belt having an arcuate outer surface.

Another object is to provide a method of making belts of the V-type wherein the belt body is built up on a mandrel and cut to provide a plurality of belts of the desired width and wherein the waste, ordinarily accompanying the cutting of V-belts is substantially eliminated.

It is another object to provide an improved method of making the core of a covered or wrapped belt as well as raw edge or raw edge molded type of belts.

Another object is to devise a method of making belts of the so-called V-type having inclined side wall working surfaces wherein the body, core or finished belt can be built up on a mandrel and cut to produce a plurality of belts of the desired trapezoidal shaped cross section without producing cut-out V-shaped waste portions which have been unavoidable in making V-belts by the known conventional methods.

These and other objects and advantages will appear from the following description taken in connection with the drawing, wherein Figure 1 illustrates in perspective, and partly broken away, a built-up belt body on the mandrel surface ready to be cut to provide a plurality of V-shaped belts;

Figure 2 is a side elevational view of the built-up belt as positioned on the mandrel and illustrating the manner of cutting the belt longitudinally of the mandrel to provide long length belts;

Figure 3 is an enlarged fragmentary cross sectional view taken substantially on the line 3—3 of Figure 2;

Figure 4 is a similar enlarged fragmentary cross sectional view taken on the line 4—4 of Figure 3;

Figure 5 diagrammatically illustrates in perspective the manner of winding the layers of the belt body onto the mandrel to form the belt;

Figure 6 is a diagrammatic view of a section of the finished belt made according to this invention;

Figure 7 illustrates diagrammatically the joining of the belt ends with a connector and the use of the belt for transmitting power between two pulley sheaves.

Referring to the drawing in detail, the method of making a V-belt according to my invention is shown wherein the belt body is formed by applying layers of rubber composition and cord onto a suitable mandrel or drum surface, as indicated at 10. As shown, a layer of fabric 11 is applied to the mandrel surface and there is wound thereon a layer of "Stiflex" 12 to form the compression section of the belt. Over the "Stiflex" layer is applied a neutral axis layer which comprises cords 13 embedded in rubber 14.

The cords, in this instance, extend longitudinally of the mandrel, i. e., parallel to the axis of the mandrel and, preferably, are laid over the "Stiflex" section in the form of a blanket wherein the cords are held together by means of the cross threads 15. The cords may be previously treated with rubber solution, such as latex, so as to increase their bond with the adjacent rubber composition. Over the cord layer is then wound rubberized fabric, as indicated at 16. This outer rubberized fabric layer is preferably convolutely wound around the built-up body of the belt a suitable number of times to form a belt having the desired number of plies in the outer tension section. Thereafter the belt body is cut longitudinally of the mandrel by knife means, such as indicated at 17. A number of belts of suitable width are cut along radial lines, as indicated at 18 in Figure 2. In this way, a plurality of V-shaped belts are provided without forming the usual waste material when endless V-belts are formed by cutting the belt body circumferentially of the mandrel, as has been the practice heretofore.

Suitable longitudinal slots 19 are provided in the surface of the mandrel so as to permit the cutting knives to extend through the entire body of the belt and be moved longitudinally across the surface of the mandrel during the cutting of the belts. The provision of a mandrel which is so constructed that the belt cutting knives can be extended below the main surface of the mandrel so as to cut the built-up belt body below the surface of the mandrel is an important feature of my invention. When the belt, or belts, have been cut from the mandrel they are placed in suitable molds and cured to form the finished belt. This is preferably accomplished by passing the belt through heated molds and curing the belt in sections as is well known in the art. If desired, the belts may be cured while on the mandrel and subsequently cut therefrom to form the finished belt.

The finished belt, as shown in Figure 6, is of V-shaped cross section having arcuate outer and inner side surfaces, as indicated at 20 and 21, respectively. This arcuate shape of the belt is an important feature in that it produces a more structurally reinforced belt which resists distortion. Moreover, the side working surfaces of the belt grip the walls of the pulley sheave more effectively due to the tendency of the belt to be flattened bringing about the outward movement of the side wall working surfaces of the belt when transmitting power under tension. Aside from this, there is obtained a material reduction in the cost of manufacturing the belt by eliminating the waste ordinarily accompanying the cutting of V-belts of this type.

There have been other belts cured or vulcanized to form a finished belt having an arcuate inner or outer surface, or both. However, these belts were always built flat and distorted or molded to an arcuate shape during the curing process. This method of molding the belt to a desired shape results in changing the tension in the cords and relative position so that in the finished belt the individual cords no longer are under the same equalized stress or tension as originally designed. This tends to bring about uneven wear and shortens the service life of the belt.

In by improved method, as herein disclosed, the cords are not distorted during curing and they all retain their original building position and tension in the finished belt. This adds materially to the life of the belt in actual service and is an important advancement in the manufacture of belts.

In the use of the belt, a belt connector, such as diagrammatically illustrated in Figure 7, is utilized to connect the ends together to form an endless belt.

It will be understood that in practicing my process, the particular belt body structure may be varied, as desired, to produce a belt having the required structural characteristics. Further, the term "rubber" includes synthetic rubber or equivalent moldable resinous material. Also, in place of "Stiflex" there may be used other rubber compositions or synthetic resinous material with or without reinforcing fibers. In place of cords, other substantially inextensible strengthening material may be used.

It will be further understood that my invention is not to be limited to the exact method herein described but may be modified as becomes necessary to adapt it to varying conditions and uses within the scope of the claims and my invention.

Having thus fully described my invention, what I claim as new and desire to secure by Letters Patent, is:

1. A process of making a belt comprising the steps of building up the belt body on the surface of a mandrel, severing the laminated layers forming the body of the belt along radial lines and parallel to the longitudinal axis of said mandrel, removing the belt therefrom, and curing the same to provide a finished belt.

2. A process of making long length belts of the V-type comprising building up the belt body on the surface of a mandrel or drum, and cutting the belt body to form long length belts of the desired width, said cutting being made longitudinally across the face of the drum or mandrel parallel to the axis of the drum or mandrel.

3. A process of making a V-belt comprising the steps of (a) superimposing laminated layers of rubberized material on the surface of a drum to provide a belt body of the desired thickness; (b) cutting the laminated belt body longitudinally of the drum surface to form a long length belt of the desired width and shape; and (c) removing the cut belt from the drum and vulcanizing the same to form a finished belt.

4. In a process of making V-belts, the steps comprising (a) superimposing rubber composition layers on the surface of a drum to form the built-up body of the belt; and (b) cutting the belt body longitudinally of the surface of the drum to form V-shaped belts having arcuate outer and inner surfaces.

5. In a process of making belts the steps comprising building up the belt body by applying rubberized layers onto the surface of a circular mandrel forming a belt body of laminated layers, vulcanizing said laminated layers to form an integral belt body while disposed on the mandrel, and cutting the belt body across the face of the mandrel at circumferentially spaced intervals and on radial lines with respect to the drum-like mandrel to provide a long length belt.

6. In a process of making V-belts the steps comprising building up the belt body by applying superimposed rubberized layers over the surface of a circular mandrel, curing the built-up layers to form an integral belt body, and cutting the belt body longitudinally across the face of the mandrel at spaced intervals circumferentially of the circular mandrel and on radial lines to provide a long length V-belt.

7. A process of making wrapped belts of trapezoidal shaped cross section comprising the steps of building up the core of the belt on the surface of a mandrel, severing the laminated layers forming the core of the belt along radial lines which are parallel to the longitudinal axis of the mandrel, removing the belt core therefrom, applying a wrapper of rubberized fabric therearound to form a wrapped belt, and curing the same to provide a finished belt.

8. A process of making trapezoidal shaped belts having arcuate outer and inner belt surfaces comprising the steps of superimposing laminated layers of rubberized material onto a circular mandrel to provide a belt body having the desired thickness, cutting the laminated belt body along radial lines parallel to the longitudinal axis of the mandrel, removing the cut belt body and applying a wrapper convolutely therearound to form a built-up wrapped belt body, and curing the same in a mold to provide a finished wrapped belt.

NORMAN J. RITZERT.